United States Patent [19]

Frechet et al.

[11] Patent Number: 5,587,441
[45] Date of Patent: Dec. 24, 1996

[54] HYPERBRANCHED POLYMERS FROM AB MONOMERS

[75] Inventors: Jean M. J. Frechet, Ithaca, N.Y.; Sadahito Aoshima, Chiba, Japan

[73] Assignee: Cornell Research Foundation, Inc., Ithaca, N.Y.

[21] Appl. No.: 335,947

[22] Filed: Nov. 8, 1994

[51] Int. Cl.⁶ .............................. C08F 4/14; C08F 16/12
[52] U.S. Cl. ..................... 526/238; 526/185; 526/217; 526/221; 526/236; 526/237; 526/259; 526/260; 526/263; 526/332; 526/346
[58] Field of Search .................... 525/247, 245, 525/242, 918; 526/238, 237, 221, 185, 217

[56] References Cited

U.S. PATENT DOCUMENTS

| | | | |
|---|---|---|---|
| 5,084,522 | 1/1992 | Frechet | 525/333.4 |
| 5,210,148 | 5/1993 | Frechet | 525/319 |
| 5,214,105 | 5/1993 | Frechet | 525/245 |

*Primary Examiner*—Fred Zitomer
*Attorney, Agent, or Firm*—Bruce F. Jacobs

[57] ABSTRACT

A process for preparing hyperbranched polymers from AB monomers using a self constructing approach is disclosed. Hyperbranched polymers of a living-like character produced by such process are also disclosed.

36 Claims, No Drawings

HYPERBRANCHED POLYMERS FROM AB MONOMERS

BACKGROUND OF THE INVENTION

Structurally, polymers are classified as either linear or branched wherein the term "branched" generally means that the individual molecular units of the branches are discrete from the polymer backbone, yet may have the same chemical constitution as the polymer backbone. Thus, regularly reacting side groups which are inherent in the monomeric structure and are of different chemical constitution than the polymer backbone are not considered as "branches"; that is, for example, the methyl groups pendant on a polydimethylsiloxane chain or a pendant aryl group in a polystyrene are not considered to be branches of such polymers. All descriptions of branching and backbone in the present application are consistent with this meaning.

The simplest branched polymers are the comb branched polymers wherein a linear backbone bears one or more essentially linear pendant side chains. This simple form of branching, often called comb branching, may be regular wherein the branches are distributed in non-uniform or random fashion on the polymer backbone. An example of regular comb branching is a comb branched polystyrene as described by T. Altores et al. in J. Polymer Sci., Part A, Vol. 3 4131–4151 (1965) and an example of irregular comb branching is illustrated by graft copolymers as described by Sorenson et al, Preparative Methods of Polymer Chemistry, 2nd Ed., Interscience Publishers, 213–214 (1968).

Another type of branching is exemplified by cross-linked or network polymers wherein the polymer chains are connected through the use of bifunctional compounds; e.g., polystyrene molecules bridged or crosslinked with divinylbenzene. In this type of branching, many of the individual branches are not linear in that each branch may itself contain side chains pendant from a linear chain and it is not possible to differentiate between the backbone and the branches. More importantly, in network branching, each polymer macromolecule (backbone) is cross-linked at two or more sites to other polymer macromolecules. Also the chemical constitution of the cross-linkages may vary from that of the polymer macromolecules. In this cross-linked or network branched polymer, the various branches or cross-linkages may be structurally similar (called regular cross-linked) or they may be structurally dissimilar (called irregularly cross-linked). An example of regular cross-linked polymers is a ladder-type poly(phenylsisesquinone) [sic] (poly-(phenylsilsesquioxane)). Sogah et al, in the background of U.S. Pat. No. 4,544,724, discusses some of these types of polymers and gives a short review of the many publications and disclosures regarding them. U.S. Pat. No. 4,435,548, discusses branched polyamidoamines; U.S. Pat. Nos. 4,507, 466, 4,558,120, 4,568,737, 4,587,329, 4,713,975, 4,871,779, and 4,631,337 discuss the preparation and use of dense star polymers, and U.S. Pat. Nos. 4,737,550 and 4,857,599 discuss bridged and other modified dense star polymers.

Other structural configurations of macromolecular materials that have been disclosed include star/comb-branched polymers, such disclosure being found in U.S. Pat. Nos. 4,599,400 and 4,690,985, and rod-shaped dendrimer polymers are disclosed in U.S. Pat. No. 4,694,064.

Hutchins et al, in U.S. Pat. Nos. 4,847,328 and 4,851,477, deal with hybrid acrylic-condensation star polymers and Joseph et al, in U.S. Pat. Nos. 4,857,615, 4,857,618, and 4,906,691, with condensed phase polymers having regularly, or irregularly, spaced polymeric branches essentially on the order of a comb structure macromolecules.

M. Gauthier et al, Macromolecules, 24, 4548–4553 (1991) discloses uniform highly branched polymers produced by stepwise anionic grafting. M. Suzuki et al, Macromolecules, 25, 7071–2 (1992) describes palladium-catalyzed ring-opening polymerization of cyclic carbamate to produce hyperbranched dendritic polyamines. Macromolecules, 24, 1435–1438 (1991) discloses comb-burst dendrimer topology derived from dendritic grafting. U.S. Pat. No. 5,041,516 discloses other dendritic macromolecules.

The various architectures of these macromolecules results in a variety of end product uses. It is desirable to produce macromolecules that are hyperbranched (containing 2 or more generations of branching) so as to enable the production of highly functional macromolecules. Increasing the functionality of a macromolecule at a multiplicity of sites within the macromolecule can make it a much more useful molecule.

Dendrimers and hyperbranched polymers have received much attention recently due to their unusual structural features and properties. In the early 1950's, Flory, J. Am. Chem. Soc., 74, 2718 (1952) discussed the potential of $AB_2$ monomers, in which A and B are different reactive groups which react with each other to form a chemical bond, for the formation of highly branched polymers. However, the formation of high molecular weight hyperbranched polymers from $AB_2$ monomers containing one group of type A and two of type B was not accomplished until 1988 when Kim et al., Polym. Prep., 29(2), 310 (1988) and U.S. Pat. No. 4,857,630 reported the preparation of hyperbranched polyphenylene.

Numerous other hyperbranched polymers have been reported since that time by Hawker et al., J. Am. Chem. Soc., 113, 4583, (1991); Uhrich et al, Macromolecules, 25, 4583 (1994); Turner et al, Macromolecules, 27, 1611 (1994); and others. See also U.S. Pat. Nos. 5,196,502; 5,225,522; and 5,214,122. All of these hyperbranched polymers are obtained by polycondensation processes involving $AB_2$ monomers. In general, these hyperbranched polymers have irregularly branched structures with high degrees of branching between 0.2 and 0.8.

The degree of branching DB of an $AB_2$ hyperbranched polymer has been defined by the equation $DB=(1-f)$ in which f is the mole fraction of $AB_2$ monomer units in which only one of the two B groups has reacted with an A group.

In contrast to hyperbranched polymers, regular dendrimers are regularly branched, macromolecules with a branch point at each repeat unit. Unlike hyperbranched polymers that are obtained via a polymerization reaction, most regular dendrimers are obtained by a series of stepwise coupling and activation steps. Examples of dendrimers include the polyamidoamide (PAMAM) Starburst™ dendrimers of Tomalia et al, Polym. J., 17, 117 (1985) or the convergent dendrimers of Hawker et al, J. Am. Chem. Soc., 112, 7638 (1990).

Recently, some highly branched polymers have been prepared in multistep processes involving a graft on graft technique that leads to a dramatic increase in molecular weight as a result of successive stepwise grafting steps. Examples of such polymers are the Combburst™ polymers of Tomalia et al., Macromolecules, 24, 1435 (1991); U.S. Pat. No. 4,694,064; and the "arborescent" polymers of Gauthier et al., Macromolecules, 24, 4548 (1991) and Macromolecular Symposia, 77, 43 (1994).

The preparation of hyperbranched polymers by a chain growth vinyl polymerization has not been accomplished previously.

DISCLOSURE OF THE INVENTION

Accordingly, the present invention is directed to a process for preparing highly branched or "hyperbranched" polymers by a chain-growth polymerization process using AB monomers. An AB monomer is one that contains two reactive groups A and B, which react independently of each other within a molecule; reaction onto A is not required to trigger the reaction of B. The A group is preferably a polymerizable vinyl group that is able to react with an active moiety such as an anion, a cation, or a conventional initiating or propagating moiety of the type well known in the art of vinyl polymerization such as those described in Principles of Polymerization, 3rd Ed., by G. Odian (Wiley) or in Polymer Synthesis 2nd Edition by P. Rempp and E. Merrill (Hüthig & Wepf) to produce a new activated group A* that is capable of further reaction with any A-containing moiety present in the polymerization mixture to give an A'-A* unit in which A' is an inactive group derived from A that acts as a building block of the final polymer.

The B group is preferably a reactive group that can be activated by an activator such as one or more external activator molecules like (i) alkyl aluminum halides, e.g. EtAlCl$_2$ and Et$_{1.5}$AlC$_{1.5}$, (ii) SnCl$_4$, (iii) SnCl$_4$ combined with Bu$_4$NCl, (iv) HI combined with I$_2$, or (v) CH$_3$SO$_3$H combined with Bu$_4$NCl and SnCl$_4$ or SnCl$_4$ combined with 2,6-di-tert-butylpyridine. Other external activators include Lewis acids, bases such as hydroxides, butyl lithium, amines and carbanions, heat, light, or radiation, which activate to produce an anion, cation, or conventional initiating or propagating moiety well known in the art of vinyl polymerization such as those described by Aoshima et al, J. Polymer Science, A, Polymer Chemistry, 32, 1729 (1994) or in Ishihama et. al. Polymer Bulletin 24 201 (1990) or in Higashimura et. al. Macromolecules 26, 744 (1993). Once activated, B becomes B*. Any B* group present in the polymerization mixture may react with any A-containing moiety present in the polymerization mixture to afford a B'-A* unit in which B' is an inactive group derived from B that acts as a building block of the final polymer.

This invention represents a new concept whereby hyperbranched polymers are obtained not from an AB$_2$ type monomer as described in the prior art, but from an AB monomer. The process comprises "self-constructing" polymers that contain throughout their growth a single polymerizable group A and a multiplicity of propagating species such as A* or B*, for example, a carbenium ion. In effect, an AB monomer becomes an AB*$_x$-type macromonomer in which x increases as the polymerization proceeds.

In the process of the present invention, the "monomer" consists of polymerizable initiator molecules (AB molecules) that are activated by an external event to produce activated polymerizable initiator molecules (AB* molecules). Not all AB molecules need to be activated to A-B* since both A* and B* can add to any available A group, and any B group that remains inactivated may become activated later as a result of an exchange process. These molecules grow by adding to any available polymerizable A group present in the reaction mixture in a process that involves successive and repeated couplings of growing polymer chains with A-containing moieties, including the growing chains themselves, until the concentration of A groups is so reduced that the chain polymerization process no longer proceeds at an appreciable rate.

According to one embodiment of the present invention, an A—A monomer is added during the polymerization, commonly in the later stages of polymerization, prior to its completion or quenching, to couple pre-formed molecules of hyperbranched polymer to increase the molecular weight of the final hyperbranched polymer. An A—A monomer is added in an amount and at a time such that precipitation of the polymer does not occur. Too much A—A may lead to undesirable crosslinking. If used, a suitable amount of A—A monomer is about 0.1 to 10 mole % of total monomer. As the amount of A—A increases, the reaction generally requires greater monitoring to terminate it prior to crosslinking or insolubilization. Suitable A—A monomers may be selected from any of divinyl ether, 1,1'-bis(2-vinyloxyethoxy)-4,4'-isopropylidene diphenol, diethyleneglycol divinylether, butanediol divinyl ether, cylohexanedimethanol divinylether, hexanediol divinyl ether, cyclohexanediol divinyl ether, poly(THF) divinyl ether, polyethyleneglycol divinyl ether, ethylene glycol divinyl ether, triethyleneglycol divinyl ether, tetraethyleneglycol divinyl ether, divinylbenzene, bis-(4-ethenylphenyl)methane, bis-1,2-(4-ethenylphenyl)ethane, ethyleneglycol dimethacrylate, bis-1,2-(4-ethenylphenoxy)ethane, or bis-1,4-(4-ethenylphenoxy)butane. Particularly preferred A—A monomers are di-vinyl ether and bis-ethenylbenzene.

The process of the present invention has a "living-like" character, whereby side reactions such as chain transfer and elimination producing a double bond, (i.e. another A group) are substantially eliminated. If such side reactions are not substantially eliminated the polymerization would result in a crosslinked polymer, which is highly branched but not soluble. Such a polymer would be quite different from those of the present invention which retain their living-like character and solubility. The ultimate end uses of the polymers of the invention are also different from those of the highly crosslinked insoluble polymers that would result if side reactions were not substantially eliminated.

Because growing chains combine with each other, their number decreases as the polymerization proceeds. However, the total number of propagating species remains very high and essentially constant because each growing polymer chain sees the number of its propagating ends multiply as the polymerization proceeds while the total number of individual chains decreases.

The "self-constructing" polymerization will generally not provide a degree of branching of 1.0, because of thermodynamic, kinetic, and steric factors that may prevent some sites from reacting in regular fashion. Therefore, a hyperbranched polymer with a degree of branching below 1.0, generally about 0.05–0.95, preferably above about 0.2, more preferably above about 0.3, and still more preferably above about 0.5, will result in all but ideal conditions, i.e. when there are absolutely no side reactions and growth follows a regular geometric pattern not affected by any steric or similar factor. The degree of branching of an AB hyperbranched polymer is the mole fraction of monomer units at branch points or chain ends.

The hyperbranched polymers of the present invention retain their living-like character in that the final polymer still contains many active sites A* and B* that could be polymerized further by addition of more A or AB monomer to produce larger hyperbranched structures or star-like polymers with hyperbranched cores. Moreover, the active sites A* and B* may be quenched to produce many functionalized chain-ends. For cationic polymerizations, suitable quenching agents are generally nucleophiles such as methanol, amines, halides, water, the sodium salt of diethyl malonate, or substituted phenyl lithium. In the case of anionic polymerizations, suitable quenching agents are generally electrophiles such as aldehydes, ketones, substituted alkyl or benzyl halides, alcohols, or water. As a result, the hyperbranched polymers have and can be designed for numerous end uses, many of which are not possible for other polymers.

The hyperbranched polymers are useful in the formulation of adhesives, carriers for drugs or biological materials, slow release formulations, crosslinking agents, paints, rheology modifiers, additives for coatings and plastics, inks, lubricants, foams, components of cosmetic formulations, hairspray, deodorents and the like, components of separation media, porosity control agents, complexing and chelating agents, carriers for chiral resolution agents, components of medical imaging systems, carriers for gene transfection, and resist or imaging materials.

DETAILED DESCRIPTION OF THE PREFERRED EMBODIMENTS

An example of the process of the present invention whereby a hyperbranched polymer is prepared from AB monomer 1 is described in Reaction Scheme 1:

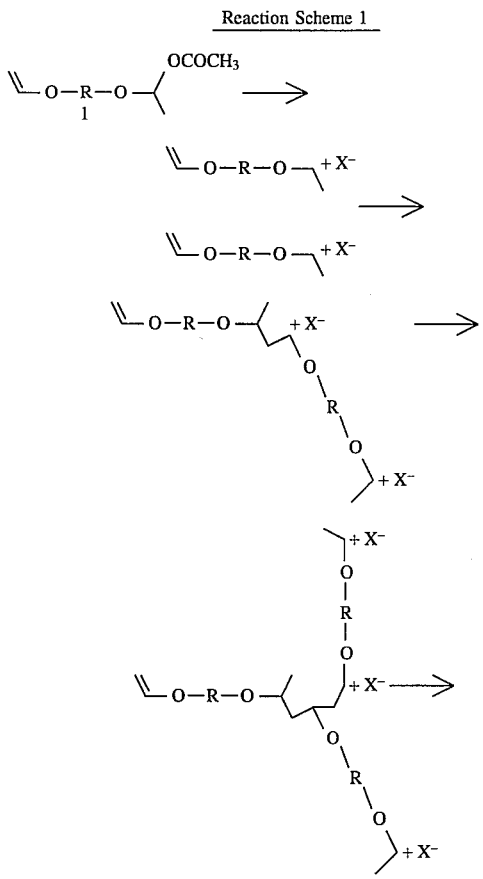

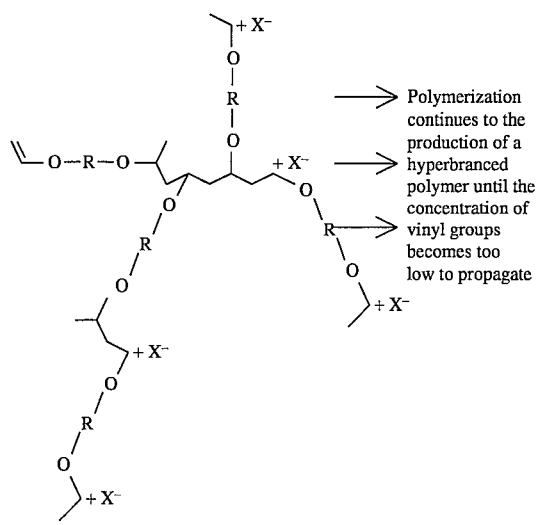

wherein R is

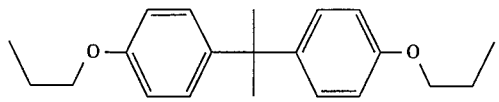

The A group of monomer 1 is a vinyloxy group that is known to polymerize under cationic conditions. The B group is an α-acetoxy alkyl ether that may be activated by addition of a Lewis acid such as ethyl aluminum sesquichloride $(C_2H_5)_{1.5}AlCl_{1.5}$ to afford AB* "living" moieties that can initiate their own self-polymerization.

As is well known in the art, the living-like polymerization of vinyl ethers requires that special conditions be maintained to ensure that undesirable side-reactions such as crosslinking, chain transfer or termination are avoided. The use of standard precautions, such as those described for example in the review by Sawamoto, Prog. Polym. Sci., 16, 111–172 (1991), are preferred. For example, polymerization is generally carried out in the absence of water and in the presence of agents such as ethers or heterocyclic compounds that help stabilize the "living-like" chain ends (propagating groups). Conditions must also be maintained to prevent elimination reactions. Suitable conditions are well known in the art and include the absence of water, selection and strength of a Lewis acid and the complex formed between the Lewis acid and the carbocationic center, the addition of a "basic" or "nucleophilic" additive such as tetrahydrofuran, dioxane, ethyl acetate, or tetrabutyl ammonium chloride, to stabilize the carbocationic propagating center, and the like. For an anionic process, suitable conditions include the use of a dry solvent such as tetrahydrofuran or cyclohexane and the absence of water or electrophilic impurities such as alcohols, aldehydes, ketones, bencylic or aliphatic halides. The use of additives such as glymes or cyclic ethers including tetrahydrofuran or dioxane, or tetramethyl ethylenediamine (TMEDA), or hexamethyl phosphoramide (HMPA) or crown ethers and cryptants (molecule-like crown ethers that can complex ionic species) that help stabilize the prepagating center is also well known in the art. (See, for example, P. Rempp and E. Merrill in "Polymer Synthesis" 2nd Edition, chapter 5, (Hüthig & Wepf).

To simplify the representation in Reaction Scheme 1, it is assumed that all AB molecules are transformed into AB* molecules at the start of the process. This is not a requirement because both A* and B* can react with any molecule containing a reactive A group.

Once the polymerization is complete, the activated A* and B* sites can be terminated by addition of a suitable reagent. In the case of a cationic polymerization as shown in Reaction Scheme 1, this reagent could be a nucleophile like methanol, water, halide ion, amine, or the sodium salt of diethyl malonate, or a substituted phenyl lithium. In the case of an anionic polymerization, the reagent could be an electrophile such as an aldehyde, ketone, substituted alkyl or benzyl halide, alcohol, or water.

In Reaction Scheme 1, the active chain-ends or propagating sites (A* and B* groups) are shown by a "+" sign indicating their cationic nature. The counterions represented by the letter "X" and a "−" sign may be any suitable counterion such as $Et_{1.5}AlCl_{1.5}(OAc)$, $C_2H_5AlCl_2OAc$, and $I_3^-$.

Reaction Scheme 2 shows a cascade of branches resulting from the cationic polymerization of monomer 1.

Reaction Scheme 2

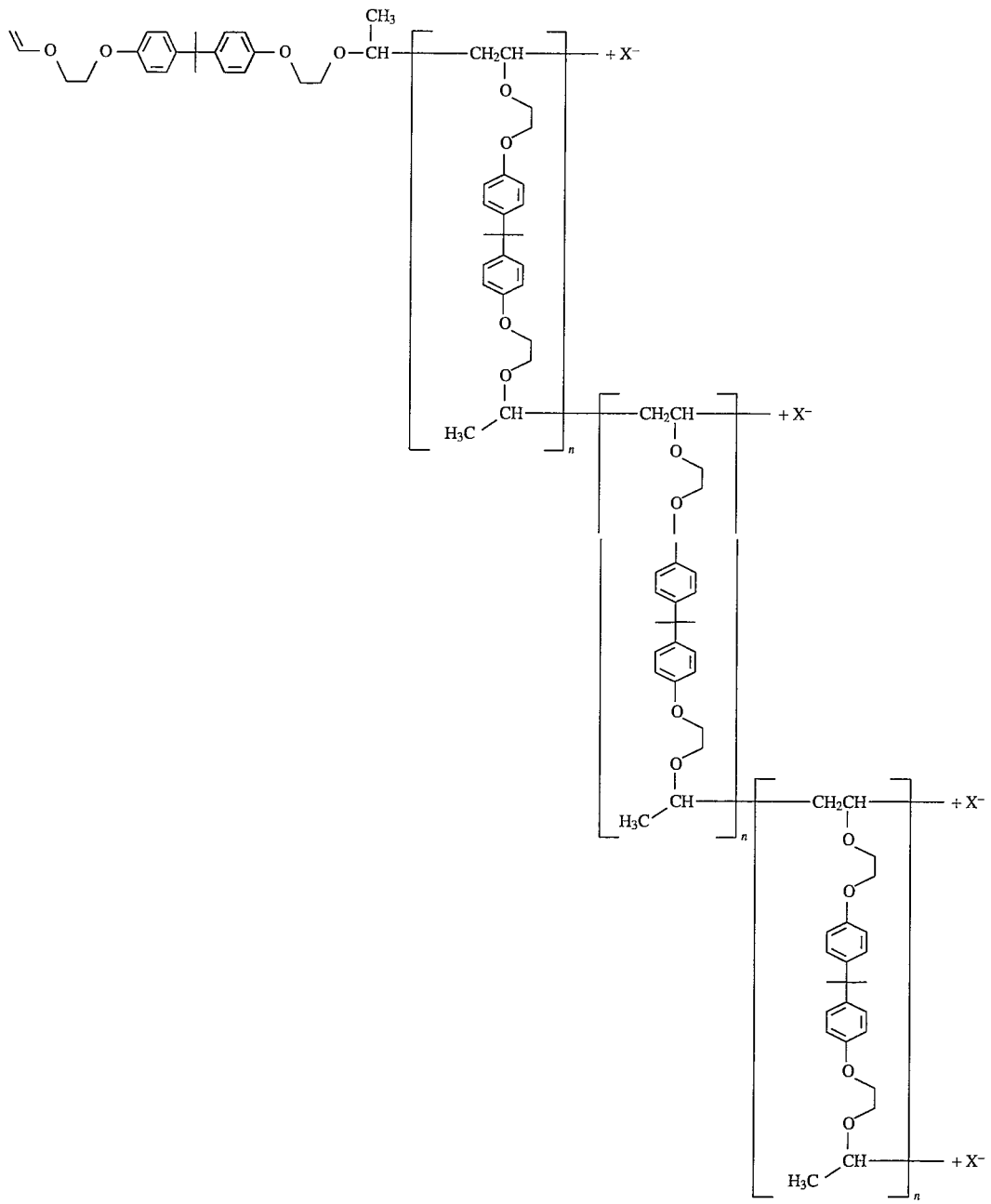

This representation is used to convey the hyperbranched nature of the polymer and it also illustrates the involvement of both A* and B* groups in growth of the hyperbranched polymer.

Reaction Scheme 3 shows the structure of the polymer of Reaction Scheme 2 after termination by the addition of methanol as described in greater detail in the Examples. Other reagents may also be used to effect termination.

B, and p is an integer of 0, 1, or 2. In the specific compositions shown below a bond is shown on A and B to show the point of attachment of either to the other or to S. The term AB monomer as used herein means $A—(S)_p—B$ In this formula, if p is 2, there may two of the same S groups or two different S groups. When p is 0, S is not present. A spacer group S changes the distance between branch points and may contribute to the final polymer properties such as Reaction Scheme 3

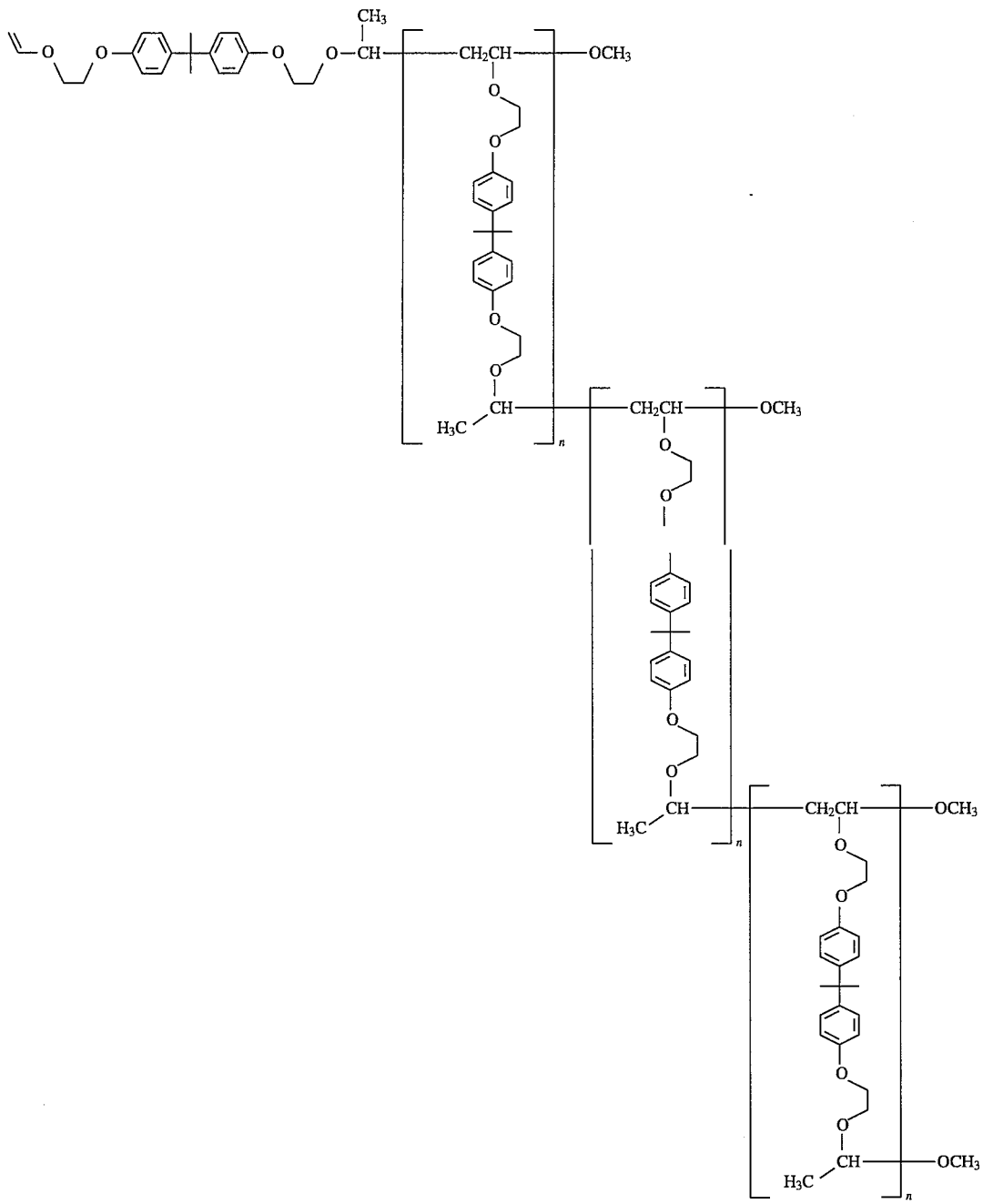

In this fashion, a hyperbranched polymer containing numerous reactive groups at its chain ends is obtained.

AB molecules useful in the present invention are best represented by the formula $A—(S)_p—B$ in which A and B are as defined above, S is a spacer group separating A from B, and p is an integer of 0, 1, or 2. In the specific resistance to oil, elongation, shape, rigidity, or the like, or it may be used to introduce reactive pendant groups, e.g. acrylic groups, masked amines, masked alcohols or protected carboxylic groups. Any such pendant group must be inert to the polymerization reaction used to prepare the hyperbranched polymer. While any A, B, and S groups may be used, they must be compatible with each other. The compatibility of A, B, and S groups is related to the reactivity of A, B, S, A* and B*. Compatible groups are those for which the reactivity of both A* and B* with an A group will be substantially similar such that the polymerization may proceed through either A* or B*. The compatibility of the S group with A and B relate to its inability to react chemically with A, B, A* or B* moities for example to cause the formation of a new active propagating center through processes such as addition, chain transfer, or elimination reaction. Since certain A, B, and S groups may not be compatible with each other, preferred such groups are specified below by compatible groups.

The first AB monomer grouping is represented by the formula $A^1(S^1)_pB^1$, wherein $A^1$ is selected from any of

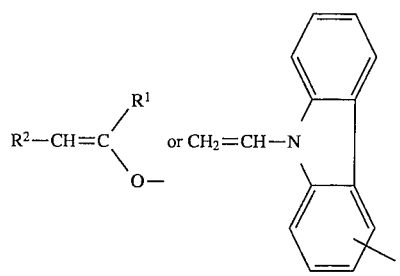

$R^1$ is H or $C_1$–$C_4$ alkyl, preferably H. $R^2$ is H or $C_1$–$C_4$ alkyl, preferably H.

A suitable companion $B^1$ group for $A^1$ groups may be represented by the general formula:

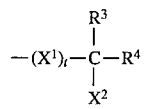

$R^3$ is selected from any of $C_1$–$C_4$ alkyl, di-phenyl, aryl such as phenyl or naphthyl, optionally substituted with one or more substituent such as halo, cyano, $C_1$–$C_4$ alkyl, and $C_1$–$C_4$ alkoxy. Preferably, $R^3$ is $C_1$–$C_4$ alkyl, most preferably methyl. $R^4$ is selected from any of H or $C_1$–$C_4$ alkyl. More preferably $R^4$ is H. $X^1$ is O. "t" is 0 or 1. $X^2$ is $OR^5$, $OCOR^5$, or halo, preferably chloro. $R^5$ is $C_1$–$C_4$ alkyl, haloalkyl, aryl, or aralkyl, more preferably methyl.

A suitable $S^1$ group which may be used with the above described companion $A^1$ and $B^1$ groups may be selected from any of $C_2$–$C_{12}$ alkylene, substituted $C_2$–$C_{12}$ alkylene wherein the substituents are selected from any of $C_1$–$C_4$ alkyl or aralkyl wherein the alkyl is $C_1$–$C_4$;

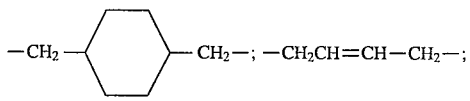

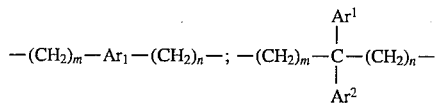

wherein m and n are the same or different and are each integers from 0 to about 18, $Ar^1$ and $Ar^2$ are the same or different and are aryl selected from phenyl, naphthyl, biphenyl, optionally substituted with one or more substituents selected from $C_1$–$C_4$ alkyl, $C_1$–$C_4$ alkoxy, halo, or acetoxy;

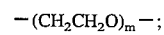

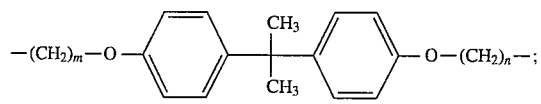

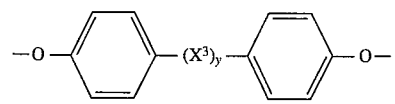

wherein y=0 or 1, and $X^3$ is selected from any of O, S, $SO_2$, $CH_2$ or CO;

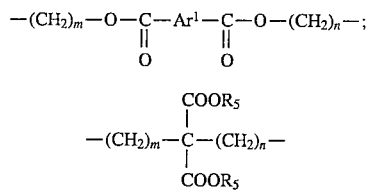

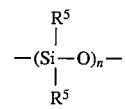

wherein $R^5$ is $C_1$–$C_4$ alkyl or aryl;

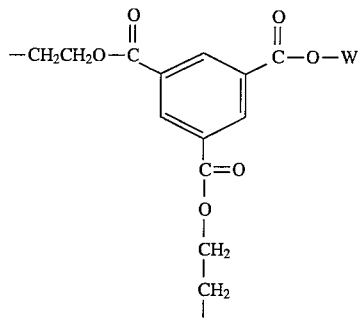

polystyrene, polyisobutylene, polyester, polyether, polyolefin, polyetherketone, polycarbonate, polysulfone; or

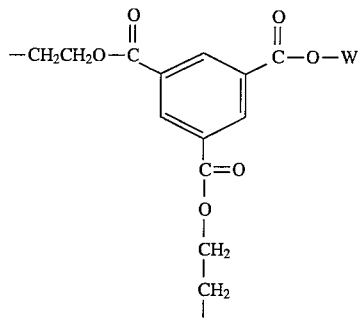

wherein W is

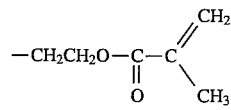

More preferably, $S^1$ is selected from any of

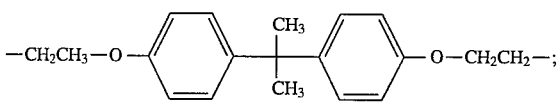

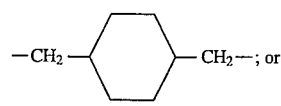

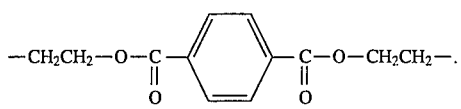

Alternatively, the A, B and S groups in an AB monomer may be represented by the formula $A^2(S^1)B^2$ wherein $A^2$ is selected from

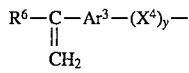

wherein $R^6$ is H or $C_1$–$C_4$ alkyl, preferably H; $Ar^3$ is aryl or N-alkyl-3-carbazoyl wherein the alkyl is $C_1$–$C_8$, preferably phenyl; $(X^4)_y$ is O or $CH_2$, preferably, $X^4$ is O attached to a phenyl $Ar^3$ at the para position; and y is 0 or 1; $B^2$ is selected from

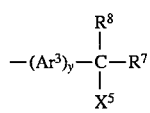

wherein $R^7$ is selected from any of H, $CH_3$, $C_1$–$C_8$ alkyl or aryl, preferably H; $R^8$ is H or $C_1$–$C_8$ alkyl, preferably methyl; $X^5$ is halo, O—$R^9$, or $OCH_3OCO$—$R^9$ wherein $R^9$ is selected from any of $C_1$–$C_8$ alkyl, $C_1$–$C_8$ haloalkyl or aryl, preferably $X^5$ is chloro.

$B^2$ may also be:

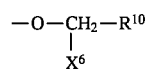

wherein $R^{10}$ is selected from any of $C_1$–$C_8$ alkyl or aryl, preferably methyl; $X^6$ is halo, preferably chloro.

Alternatively, the A, B and S groups in an AB monomer may be represented by the formula $A^3(S^2)B^3$ wherein: $A^3$ is selected from any of

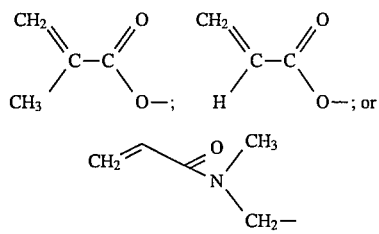

$B^3$ is selected from any of

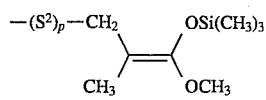

wherein $S^2$ is $C_1$–$C_8$ alkyl, aryl, aralkyl substituted aralkyl or —($CH_2$—$CH_2$—O—$)_r$, wherein r is 1–12.

Alternatively, the AB monomer is a halo-alkylsubstituted styrene of the formulas:

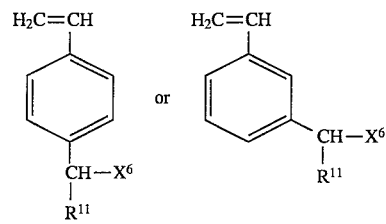

wherein $X^6$ is chlorine or bromine and $R^{11}$ is H or $C_1$–$C_6$ alkyl. Preferably $R^{11}$ is H or $CH_3$.

Currently preferred AB monomers may be selected from any of 1-(2-vinyloxyethyloxy)-1'-[2-(1-acetoxyethoxy)-ethyloxy]-4,4'-iso propylidene diphenol; 1-vinyloxymethyl-4-(1-acetoxy)ethyloxymethylcyclohexane; 1-(2-vinyloxyethyl)-4-[1-acetoxyethyloxy)ethyl]terephthalate; 2-(2-vinyloxyethyl)-2-[(1-acetoxyethyloxy)ethyl]diethyl malonate; 1-(2-vinyloxyethyl)-3-[(1-acetoxyethyloxy)ethyl]-5-(2-methacryloyoxyethyl)-1,3,5-benzenetricarboxylate; 1-[(4-ethenyl)phenoxymethyl]-4-[4-(1-chloroethyl)phenoxymethyl]benzene; 4-(2-(1-chloroethyloxy))ethyloxystyrene; 4-(1-bromoethyl)styrene; and 4-(1-chloroethyl)styrene and chloromethylstyrene.

As used herein, unless otherwise noted alkyl and alkoxy whether used alone or as part of a substituent group, include straight and branched chains. For example, alkyl radicals include methyl, ethyl, propyl, isopropyl, n-butyl, isobutyl, sec-butyl, t-butyl, n-pentyl, 3-(2-methyl)butyl, 2-pentyl, 2-methylbutyl, neopentyl, n-hexyl, 2-hexyl and 2-methylpentyl. Alkoxy radicals are oxygen ethers formed from the previously described straight or branched chain alkyl groups.

The term "aryl" as used herein alone or in combination with other terms indicates aromatic hydrocarbon groups such as phenyl or naphthyl. The term "aralkyl" means an alkyl group substituted with an aryl group.

While certain currently preferred substituents are identified above, these are not intended in any manner to limit the substituents which may be present on the various AB and C compounds, provided that they do not interfere in the primary polymerization reactions.

EXAMPLES

In the Examples, the following abbreviations have the meanings recited: DMSO=Dimethyl sulfoxide; THF=Tetrahydrofuran; CEVE=2-Chloroethyl vinyl ether; TLC=Thin layer chromatography; Et=ethyl and SEC=Size-exclusion chromatography; Bu=butyl; Ac=acetyl.

EXAMPLE I

Preparation of Vinyl Ether-Type A-B Molecule (1) 1-(2-vinyloxyethyloxy)-1'-[2-(1-acetoxyethoxy)-ethyloxy]-4,4'-isopropyllidenediphenol

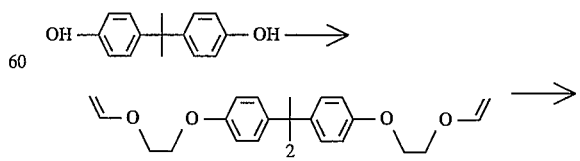

-continued

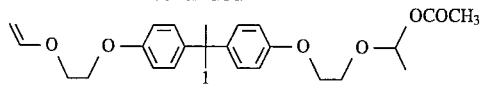

A mixture of bisphenol A (23g), powdered NaOH (12g), and DMSO (45ml) were heated at 70°–75° C. with stirring under nitrogen for 1.5 hours. To the mixture, CEVE (39g) was added slowly over 2 hours. An additional 20ml of DMSO was added to this viscous mixture. Then the solution was heated for another 5 hours at 70°–75° C., and was allowed to stand overnight at room temperature. The reaction mixture was washed with water, and the isolated crude product was purified by crystallizing twice from ethanol. The aromatic bisvinyl ether (2) was obtained as a white-pale yellow solid in 75% yield. The preparation of acetic acid-adduct of aromatic bisvinyl ether was carried out as follows. To the solution of aromatic bisvinyl ether 2 (7.4g) in toluene (15ml), was added a slight excess of glacial acetic acid (1.4g). The mixture was heated at 70° C. under nitrogen for 8 hours. After cooling the mixture was evaporated to remove toluene and unreacted acetic acid. A yellowish oil was obtained almost quantitatively (>95%). TLC showed that the crude products contained three major materials: unreacted 2, mono-adduct of acetic acid to 2 vinyl ether 1, and di-adduct of acetic acid. The mono-adduct of acetic acid to 2 (1), an A-B type molecule, was separated from the mixture by flash chromatography eluting with hexane/diethyl ether (60/40); the Rf values of three fractions are 0.56, 0.31, 0.14, respectively. The eluent was then removed on a rotary evaporator and vacuum dried for 1 hour. A colorless transparent oil was obtained (43% yield based on 2).

Cationic Polymerization of 1 as an A-B Trade Molecule

Purified 1 was dissolved in dry THF and the solution was allowed to stand overnight over granular $CaH_2$, to remove trace amounts of water. The transparent supernatant fraction was then transferred to the reaction vessel and used to prepare the monomer solution. Polymerization was carried out under dry nitrogen in a baked glass vessel equipped with a three-way stopcock. The reaction was initiated by addition of $Et_{1.5}AlCl_{1.5}$ in toluene used as an activator to the monomer solution in THF at 0° C. ($[Et_{1.5}AlCl_{1.5}]0=[1]_0=0.15$mol/l, total scale of the reaction: 5ml). THF was used as a solvent to stabilize the propagating carbocations by its nucleophilic interaction and prevent the occurrence of various side reactions such as crosslinking, chain transfer reaction etc. After 24 hours, the reaction was quenched by 2ml of 0.3wt % ammonia in methanol. The quenched reaction mixture was diluted with ethyl acetate and then washed with dilute hydrochloric acid (0.6mol/l) and water to remove the initiator residues. After neutralization, the polymer product was recovered by evaporation of the solvents under reduced pressure, and vacuum dried overnight. The colorless polymer is isolated quantitatively as a thicks liquid. The polymer is completely soluble in THF, ethyl acetate, and chloroform. The weight average molecular weight measured by SEC with polystyrene standard (THF, 40° C.) was $MW=10^4$. The molecular weight distribution curve showed a significant shoulder extending to $10^5$. The structure of the polymer was confirmed by NMR and IR.

EXAMPLE II

Preparation of Hyperbranched Poly(1) with Higher Molecular Weight

The polymerization of 1 was carried out as above with addition of a small amount of 2 (A—A type molecule, 0.01 mol/l) after 24 hours followed by quenching. The work up process was similar to that of Example I. The polymer was obtained in 90% yield. The polymer is completely soluble in THF, ethyl acetate, chloroform. The SEC of the polymer shows a value of $MW=3\times10^5$.

EXAMPLE III

Preparation of Vinyl Ether-Type A-B Molecule (3) 1-vinyloxymethyl-4-(1-acetoxy)ethyloxymethyclohexane

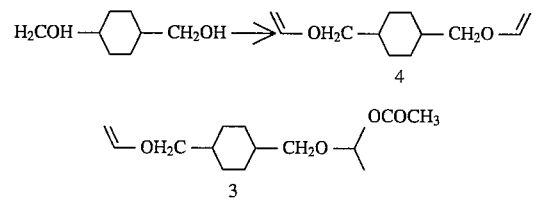

Vinyl ether-type A-B molecule 3 was prepared by the following two steps that include the synthesis of bisvinyl ether 4 by vinyl transetherification and the reaction with acetic acid. To a solution of distilled ethyl vinyl ether (29ml, 0.3mol), 1,4-cyclohexyldimethanol (11g, 0.075mol), and 1,4-dioxane (15ml) were added mercury(II) acetate (0.75g, 0.0024mol) as a catalyst and molecular sieves 4A (20g) as an adsorbent of ethanol. The reaction was carried out at room temperature for 5 hours with occasional shaking. The reaction was then stopped by adding 2g of anhydrous potassium carbonate. The reaction mixture was washed with water, dried over $Na_2SO_4$, and fractionated by flash chromatography eluting with hexane/diethyl ether (50/50) (yield ~20%).

The reaction of 4 (5.2g) with acetic acid (1.9g) was carried out at 70° C. under nitrogen. After 4 hours, the reaction mixture was allowed to cool, and evaporated to remove unreacted acetic acid. A colorless oil was obtained. The mono-adduct of acetic acid to 4, an A-B type molecule (3), was separated from the mixture by flash chromatography eluting with hexane/diethyl ether (80/20). The eluent was removed on a rotary evaporator and vacuum dried for 1 hour. The product was obtained as a colorless transparent oil (40% yield based on 4).

Cationic Polymerization of 3 as an A-B Type Molecule

Purified 3 was dissolved in dry ethyl acetate and the solution was allowed to stand overnight over granular $CaH_2$ to remove trace amounts of water. The transparent supernatant fraction was transferred to the reaction vessel and used to prepare the monomer solution. The polymerization process was similar to that of compound 1 (see Example I) except for the use of $EtAlCl_2$ as the activator instead of $Et_{1.5}AlCl_{1.5}$. The reaction was initiated by addition of $EtAlCl_2$ in hexanes to a monomer solution in ethyl acetate at 0° C. ($[EtAlCl_2]_0=[3]_0=0.15$mol/l, total scale of the reaction: 5ml). Ethyl acetate was used as a solvent to stabilize the propagating carbocations by its nucleophilic interaction and prevent the occurrence of various side reactions such as crosslinking, chain transfer reaction etc. The polymerization reaction progressed homogeneously. After 2 hours, the reaction was quenched by 2ml of 0.3 wt % ammonia in methanol. Work up was as described for compound 1 (see Example I). The polymer was obtained in 97% yield as a viscous liquid. The polymer was completely soluble in THF, ethyl acetate, chloroform. The weight average molecular weight measured by SEC with polystyrene standard (THF, 40° C.) was $MW=15,000$. The molecular weight distribution curve showed a shoulder extending above $10^5$. The structure of the polymers was confirmed by NMR and IR.

EXAMPLE IV

Preparation of Vinyl Ether-Type A-B Molecule (5) 1-(2-vinyloxyethyl)-4-[1-acetoxyethyloxy)ethyl]terephthalate A solution of terephthaloyl chloride (10g, 0.05mol) in diethyl ether (60ml) was added slowly to the solution of 2-hydroxyethyl vinyl ether (11g, 0.12mol) in pyridine (17g) at 0° C. with stirring under nitrogen. The reaction mixture was allowed to react for another 15 min at 0° C., and then left overnight at room temperature

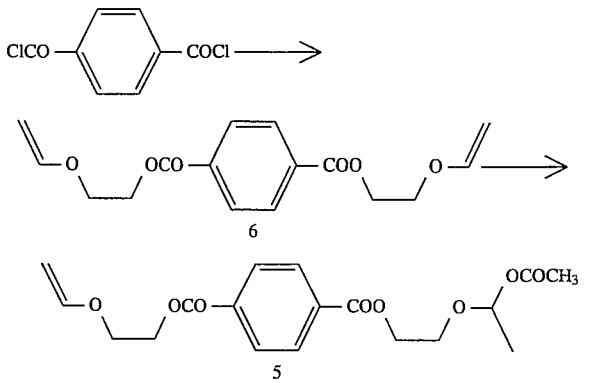

with stirring under nitrogen. The solution was poured into water (300 ml) with stirring, and the product was extracted with diethyl ether. The organic layer was washed with water, and dried over MgSO$_4$. The product was recovered by evaporation of the solvent under reduced pressure, to yield a white solid (15g, 96% based on terephthaloyl chloride). The compound was purified by flash chromatography eluting with CH$_2$Cl$_2$ to give 12g of compound 6. The preparation of the acetic acid-adduct was carried out as previously described for compound 1 (see Example I). To the solution of 6 (5g) in toluene (14ml), was added a slight excess of glacial acetic acid (1.2g), and the mixture was heated at 70° C. under nitrogen for 10 hours. The reaction mixture was then allowed to cool and evaporated to remove toluene and unreacted acetic acid. The colorless oil was obtained almost quantitatively (>95%).

The mono-adduct of acetic acid to 6, an A-B type molecule 5, was separated from the mixture by flash chromatography eluting with hexane/diethyl ether (50/50). The eluent was then removed on a rotary evaporator and vacuum dried for 1 hour. A white solid was obtained (41% yield based on terephthaloyl chloride).

Cationic Polymerization of 5 as an A-B Type Molecule

Purified 5 was dissolved in dry THF and allowed to stand overnight over granular CaH$_2$ to remove trace amounts of water. The polymerization and following work up processes were similar to those for compound 3 (Example III). The polymer was obtained in 95% yield. The polymer was completely soluble in THF, ethyl acetate, chloroform. The polymer was characterized as described in Examples I and III.

EXAMPLE V

Preparation of Vinyl Ether-Type A-B Molecule (7) 2-(2-vinyloxyethyl)-2-[(1-acetoxyethyloxy)ethyl]diethyl malonate

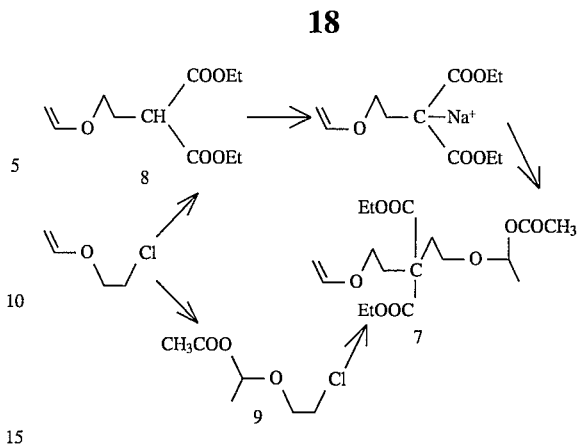

To a solution of sodium ethoxide (8.7g) in absolute ethanol (71ml) was added at room temperature, ethyl malonate (19g) and CEVE (24ml) in this order. The solution was heated at reflux with stirring under nitrogen for 5 hours. After most of the ethanol was evaporated under reduced pressure, the reaction mixture was diluted with diethyl ether, and the sodium chloride was filtered off. The organic layer was washed with 10% aqueous NaCl, then dried over MgSO$_4$, and evaporated under reduced pressure to give a liquid product in almost quantitative yield.

Compound 9 was prepared by the reaction of CEVE (10g) and a slight excess of glacial acetic acid (7g) at 40° C. under nitrogen overnight, to give a slightly yellowish liquid almost quantitatively. Quantitative addition of acetic acid was also confirmed by 1H NMR. The solution of sodium salt of 8 was prepared by treating distilled 8 with sodium hydride in THF at 40° C. under nitrogen for 1 hour. The reaction with excess distilled compound 9 was carried out at 40° C. under nitrogen for 24 hours. The resulting reaction mixture was washed with water, dried with MgSO$_4$, and then evaporated. The crude product was purified by chromatography, to give compound 7 in 48% yield.

Cationic Polymerization of 7 as an A-B Type Molecule

Purified 7 was dissolved in dry THF and the solution was allowed to stand overnight over granular CaH$_2$ just before use as a monomer solution, to remove trace amounts of water. The polymerization and the following work up process were similar to those for compound 3 (see Example III). The polymer was obtained in a 95% yield. The polymer was completely soluble in THF, ethyl acetate, and chloroform. The polymer was characterized as described in Examples I and III.

EXAMPLE VI

Preparation of Vinyl Ether-Type with a Functional group (10) 1-(2-vinyloxyethyl)-3-[(1-acetoxyethyloxy)ethyl]-5-(2-methacryloyloxyethyl)-1,3,5-benzene tricarboxylate

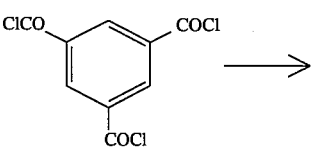

19
-continued

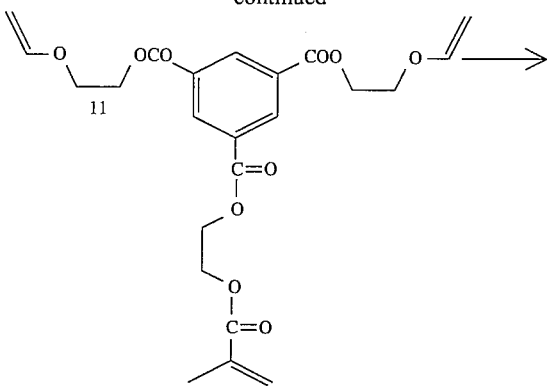

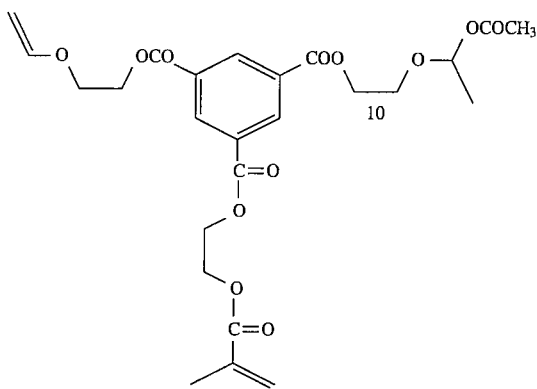

A solution of 1,3,5-benzenetricarbonyl trichloride (1.8g), purified by recrystallization from hexanes, in $CH_2Cl_2$ (20ml) was slowly added to the solution of 2-hydroxyethyl vinyl ether (1.2g) and 2-hydroxyethyl methacrylate (0.8g) in pyridine (60ml) at 0° C. with stirring under nitrogen, and the mixture was allowed to stir overnight at room temperature. The solution was diluted with $CH_2Cl_2$, washed with water, and dried over MgSO4, and the solvent was removed under reduced pressure. The compound having two vinyloxy groups and one methacrylate group 11 was separated by flash chromatography eluting with hexane/diethyl ether to give compound 11 (35% based on 1,3,5-benzenetricarbonyl trichloride).

The preparation of the acetic acid-adduct was carried out in a manner similar to that for compound 1 (see Example I). To the solution of 11 (3.2g) in toluene (14ml), was added a slight excess of glacial acetic acid (0.6g), and the mixture was heated at 70° C. under nitrogen for 10 hours. The reaction mixture was then allowed to cool and evaporated to remove toluene and unreacted acetic acid. The colorless oil was obtained almost quantitatively (>95%).

The mono-adduct of acetic acid to 11, an AB-type molecule having a pendant functional group (10), was separated from the mixture by chromatography. The eluent was then removed on a rotary evaporator and vacuum dried for 1 hour. A white solid was obtained (41% based on 11).

Cationic Polymerization of 10 as an A-B Type Molecule

Purified 10 was dissolved in dry THF and the solution was allowed to stand overnight over granular $CaH_2$ to remove trace amounts of water. The polymerization and the following work up process were similar to that for compound 3 (see Example III). The polymer was obtained in 95% yield. The polymer was completely soluble in THF, ethyl acetate, and chloroform. The polymer was characterized as described in Examples I and III.

20
EXAMPLE VII

Preparation of Styrene-Type A-B Molecule (12) 1-[(4-ethenyl)phenoxymethyl]-4-[4-(1-chloroethyl)phenoxymethyl]benzene

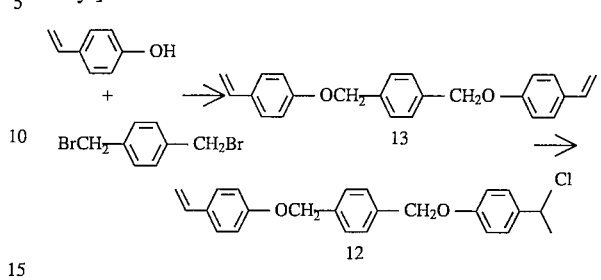

A mixture of freshly prepared p-hydroxystyrene (12g), α,α'-dibromo-p-xylene (13.2g), dried potassium carbonate (17.3g), and 18-crown-6 (2.6g) in dry acetone (100ml) was heated to reflux and stirred vigorously under nitrogen for 20 hours. The reaction mixture was allowed to cool and evaporated to dryness. The residue was partitioned between $CH_2Cl_2$ and water, and the aqueous layer was further extracted with $CH_2Cl_2$. The combined organic layers were then dried and evaporated to dryness. After purification by chromatography a 26% yield of compound 13 was isolated.

The HCl-adduct was prepared by bubbling dry HCl gas through a solution of 13 in toluene at 0° C. The formation of mono-adduct of HCl 12 was followed by TLC, which showed that the crude product contained four materials. Any remaining HCl in the solution was removed by bubbling dry nitrogen gas. The mono-adduct of HCl to 13 (12), an A-B type molecule, was separated from the mixture by chromatography. After evaporation of the solvent under reduced pressure and vacuum drying, 12 was obtained in 31% yield.

Cationic Polymerization of 12 as an A-B Type Molecule

Purified 12 was dissolved in dry toluene. The polymerization process was similar to that of compound 1 (Example I), except for the use of different activator. Polymerization was carried out under dry nitrogen in a baked glass vessel equipped with a three-way stopcock. The reaction was initiated by mixing the of $ZnCl_2$ in diethyl ether to the monomer solution in toluene at 0° C. ([12]$_0$=0.15 mol/l, [$ZnCl_2$]$_0$=0.03mol/l, total scale of the reaction: 5ml). The work up process was also similar to that of compound 1 (Example I). The polymer was obtained in 85% yield. The polymer was completely soluble in THF, ethyl acetate, and chloroform. The polymer was characterized as described in Examples I and III.

EXAMPLE VIII

Preparation of Styrene-Type A-B Molecule (14) 4-(2-(1-chloroethyloxy))ethyloxystyrene

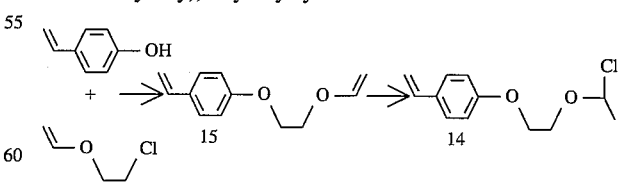

A mixture of p-hydroxystryrene (12g), powdered NaOH (6g), and DMSO (40ml) was heated at 70°–75° C. with stirring under nitrogen for 1.5 hours. To the mixture, CEVE (20g) was added slowly over 2 hours. Then the solution was heated for another 5 hours at 70°–75° C., and was allowed to stand overnight at room temperature. The reaction mixture was washed with water, and the isolated crude products were purified by crystallization. Compound 15 was obtained in 70% yield. The HCl-adduct to 15 was prepared by bubbling dry HCl gas through a solution of 15 in toluene at 0° C. The formation of mono-adduct of HCl (14) was followed by TLC. Any remaining HCl in the solution was removed by bubbling dry nitrogen gas. The mono-adduct of HCl to 15, an A-B type molecule, was separated from the mixture by chromatography. After evaporation of the solvent under reduced pressure and vacuum drying, 14 was obtained in 46% yield.

Cationic Polymerization of 14 as an A-B Type Molecule

Purified 14 was dissolved in dry toluene. The polymerization process was same as that of compound 12 (Example VII). The reaction was initiated by mixing the $ZnCl_2$ in diethyl ether used as an activator and the monomer solution in toluene at 0° C. ($[14]_0$=0.15 mol/l, $[ZnCl_2]_0$=0.06mol/l, total scale of the reaction: 5ml). The work up process was also the same as that for compound 12 (see Example VII). A viscous polymer was obtained in 80% yield. The polymer was completely soluble in THF, ethyl acetate, chloroform. The polymer was characterized as described in Examples I and III.

EXAMPLE IX

Copolymerization of Two Different A-B Type Molecules

The copolymerization of two different A-B type molecules of comparable reactivities was carried out similarly to Examples I and III. Purified 1 and 3 were dissolved in dry THF and the solution was allowed to stand overnight over granular $CaH_2$ to remove trace amounts of water. The transparent supernatant fraction was transferred to the reaction vessel and used as the monomer solution. The polymerization process was similar to those for compound 3 (see Example III). The reaction was initiated by addition of $EtAlCl_2$ in hexanes to a monomer solution in THF at 0° C. ($[EtAlCl_2]_0$=$[1]_0$+$[3]_0$=0.15mol/l, total scale of the reaction: 5ml). THF was used as a solvent to stabilize the propagating carbocations by its nucleophilic interaction and prevent the occurrence of various side reactions such as crosslinking, chain transfer reaction etc. After 10 hours, the reaction was quenched by 2ml of 0.3 wt % ammonia in methanol. Work up was as described for compound 1 (see Example I). The polymer was obtained in 97% yield as a viscous liquid. The polymer was completely soluble in THF, ethyl acetate, chloroform. The polymer was characterized as described in Examples I and III.

EXAMPLE X

Polymerization of 4-(1-chloroethyl) styrene.

A freshly dried glass apparatus was used for this polymerization under nitrogen atmosphere. A solution of 4-(1-chloroethyl) styrene (0.55g, 3.3 mmoles) in dichloromethane (4.5ml) was cooled to 0° C. then pre-cooled $SnCl_4$ (0.5ml of 1M solution in dichloromethane) was added under nitrogen. A color change was observed upon mixing and after 8 hours the polymerization was quenched by addition of pre-chilled methanol (2ml) containing a trace of ammonia. The color was discharged and the mixture diluted with dichloromethane (30ml) then washed with 2% aqueous HCl, (40ml) and distilled water (5 times, 40 ml each). The organic layer was concentrated and the polymer (80% yield) isolated by precipitation. The polymer was soluble in THF. After reprecipitation into hexane its molecular weight measured by standard GPC with polystyrene standards was approximately 90,000 daltons while the molecular weight obtained by universal calibration using in-line viscometry was 300,000 daltons, confirming the hyperbranched character of the product. The structure of the polymer was further confirmed by NMR in $CDCl_3$ and by infrared analysis.

EXAMPLE XI

Polymerization of 4-(1-chloroethyl) styrene.

The polymerization of the same monomer was also accomplished as described above using inverse addition of the pre-chilled monomer solution (4 mmoles) in dichloromethane (5ml) to a solution containing $SnCl_4$ (2 mmoles) and tetrabutylammonium chloride (1 mmole) in dichloromethane cooled to −30° C. Once the addition was complete the mixture was brought slowly from −30° C. to 0° C. with occasional mixing until the polymerization was quenched after 12 hours as described above. The polymer was processed and characterized as described above in Example X.

What is claimed is:

1. A process for the preparation of a hyperbranched polymer comprising initiating polymerization of and thereafter polymerizing in a single polymerization an AB monomer in which A and B are reactive groups that react independently of each other in which group A is a polymerizable group that is polymerized by opening of a double bond or ring and group B is a precursor of a moiety which initiates the polymerization of A as a result of being activated.

2. The process of claim 1, wherein the polymerization is carried out so that the polymer contains throughout its growth a single polymerizable group A and a multiplicity of propagating species A* and B*.

3. The process of claim 2, wherein the single polymerizable group is a vinyl group.

4. The process of claim 1, wherein the process is carried out in a manner so that it is sufficiently free of side reactions that an insoluble crosslinked polymer is not produced.

5. The process of claim 1, wherein the AB monomer is represented by the general formula $A^1(S^1)_pB^1$ wherein p is 0, 1 or 2; wherein $A^1$ is selected from the group consisting of

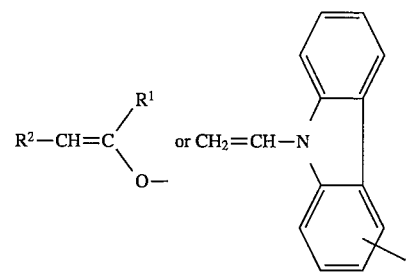

wherein $R^1$ is selected from the group consisting of H and $C_1$–$C_8$ alkyl; $R^2$ is selected from the group consisting of H, $C_1$–$C_8$ alkyl;

wherein $B^1$ is represented by the general formula:

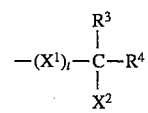

wherein $R^3$ is selected from the group consisting of $C_1$–$C_8$ alkyl, di-phenyl, aryl, and substituted aryl; $R^4$ is selected from the group consisting of H and $C_1$–$C_8$ alkyl; $X^1$ is O; t is 0 or 1; $X^2$ is selected from the group consisting of —$OR^5$, —$OCOR^5$, and halo; and $R^5$ is selected from the group consisting of $C_1$–$C_8$ alkyl, $C_1$–$C_8$ haloalkyl, aryl, and aralkyl wherein the alkyl group is $C_1$–$C_4$;

wherein $S^1$ is selected from the group consisting of $C_2$–$C_{12}$ alkylene, substituted $C_2$–$C_{12}$ alkylene wherein the substituents are selected from the group consisting of $C_1$–$C_4$ alkyl, or aralkyl wherein the alkyl group is $C_1$–$C_4$,

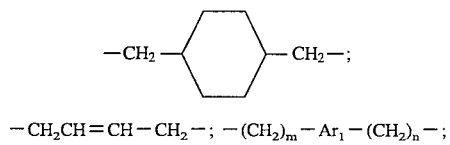

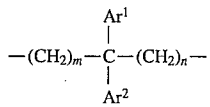

wherein m and n are the same or different and are integers from 0 to 18; $Ar^1$ and $Ar^2$ are the same or different and are selected from the group consisting of aryl, biphenyl, and substituted aryl, wherein the substituents are selected from the group consisting of $C_1$–$C_4$ alkyl, $C_1$–$C_4$ alkoxy, halo, and acetoxy;

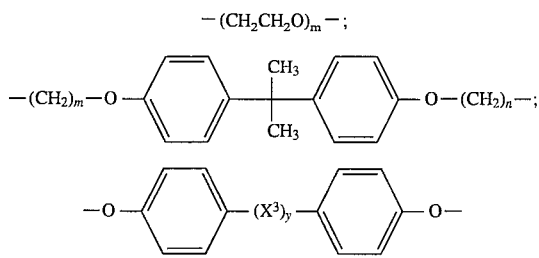

wherein y=0 or 1, and $X^3$ is selected from the group consisting of O, S, $SO_2$, $CH_2$, and CO;

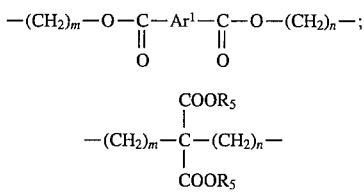

wherein $R^5$ is selected from the group consisting of $C_1$–$C_4$ alkyl and aryl;

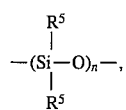

polystyrene, polyisobutylene, polyester, polyether, polyolefin, polyetherketone, polycarbonate, polysulfone; and

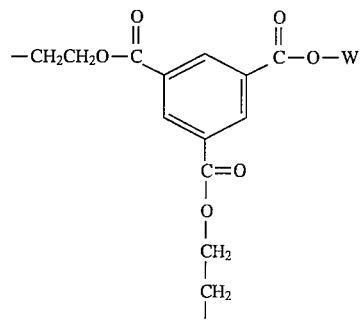

wherein W is

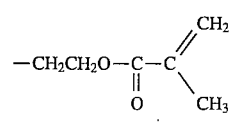

6. The process of claim 5, wherein $R^1$ is H; $R^2$ is H; $B^1$ is represented by the general formula:

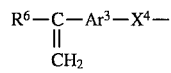

wherein $R^3$ is $C_1$–$C_4$ alkyl; $R^4$ is H; $X^1$ is O; t is 0 or 1; and $X^2$ is halo.

7. The process of claim 5, wherein $S^1$ is selected from the group consisting of:

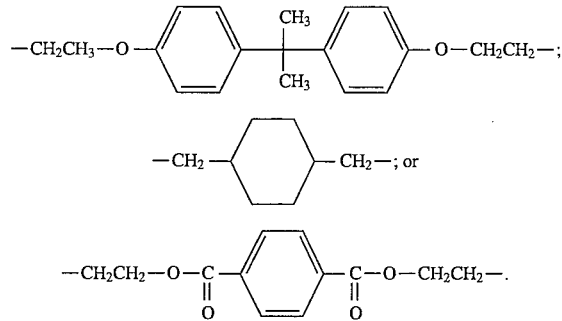

8. The process of claim 1, wherein the AB monomer is represented by the general formula $A^2(S^1)_pB^2$ wherein p is 0, 1, or 2; wherein $A^2$ is selected from the group consisting of:

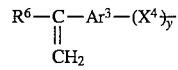

wherein $R^6$ is selected from the group consisting of H and $C_1$–$C_4$ alkyl; $Ar^3$ is selected from the group consisting of aryl and N-alkyl-3-carbazoyl wherein the alkyl is $C_1$–$C_8$; $X^4$ is selected from the group consisting of O and $CH_2$; and y is 0 or 1;

wherein $B^2$ is selected from the group consisting of

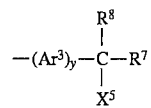

wherein $R^7$ is selected from the group consisting of H, $C_1$–$C_8$ alkyl, and aryl; $R^8$ is selected from the group consisting of H and $C_1$–$C_8$ alkyl; $X^5$ is selected from the group consisting of halo, O—$R^9$, and $OCH_3OCO$—$R^9$ wherein $R^9$ is selected from the group consisting of $C_1$–$C_8$ alkyl, $C_1$–$C_8$ haloalkyl and aryl; and

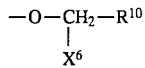

wherein $R^{10}$ is selected from the group consisting of $C_1$–$C_8$ alkyl and aryl, and $X^6$ is halo; and wherein $S^1$ is selected from the group consisting of $C_2$–$C_{12}$ alkylene, substituted $C_2$–$C_{12}$ alkylene wherein the substituents are selected from any of $C_1$–$C_4$ alkyl or aralkyl wherein the alkyl group is $C_1$–$C_4$ alkyl, or aralkyl, wherein the alkyl group is $C_1$–$C_4$;

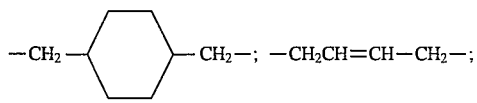

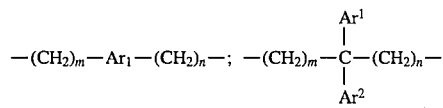

wherein m and n are the same or different and are integers from 0 to 18; $Ar^1$ and $Ar^2$ are the same or different and are selected from the group consisting of aryl, biphenyl, and substituted aryl, wherein the substituents are selected from the group consisting of $C_1$–$C_4$ alkyl, $C_1$–$C_4$ alkoxy, halo, and acetoxy;

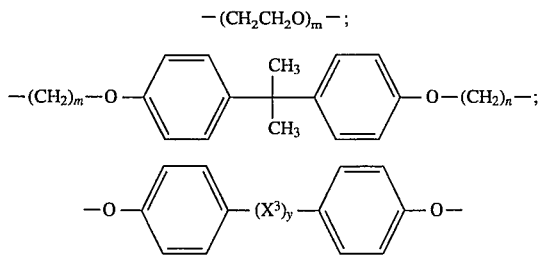

wherein y=0 or 1, and $X^3$ is selected from the group consisting of O, S, $SO_2$, $CH_2$, and CO;

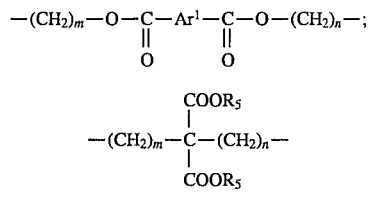

wherein $R^5$ is selected from the group consisting of $C_1$–$C_4$ alkyl and aryl;

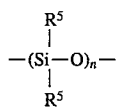

polystyrene, polyisobutylene, polyester, polyether, polyolefin, polyetherketone, polycarbonate, polysulfone; and

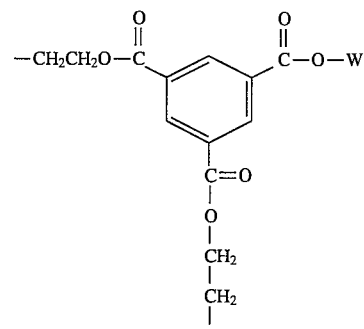

wherein W is

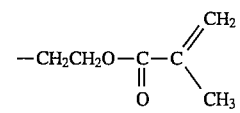

9. The process of claim 8, wherein $R^6$ is H;; $Ar^3$ is phenyl; $(X^4)_y$ is O attached to a phenyl $Ar^3$ at the para position; y is 0 or 1; and when $B^2$ is selected from

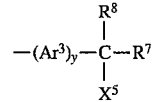

wherein $R^7$ is H; $R^8$ is methyl; $X^5$ is chloro; and

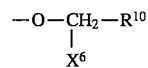

wherein $R^{10}$ is methyl; and $X^6$ is chloro.

10. The process of claim 1, wherein the AB monomer is represented by the general formula $A^3(S^2)_pB^3$ wherein p is 0 1 or 2; wherein $A^3$ is selected from the group consisting of

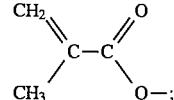

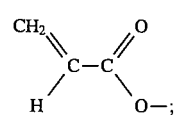

or

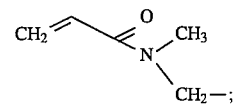

wherein $B^3$ is

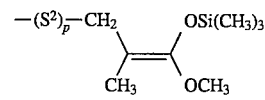

wherein $S^2$ is selected from the group consisting of $C_1$–$C_8$ alkyl, aryl, substituted aryl, aralkyl, substituted aralkyl, and —($CH_2$—$CH_2$—O—)$_r$, wherein r is about 1–12.

11. The process of claim 1, wherein the AB monomer is a haloalkyl substituted styrene selected from the group consisting of

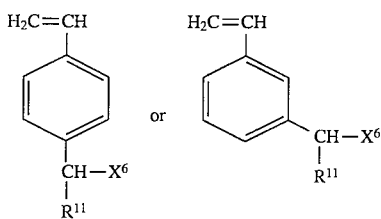

wherein $X^6$ is chlorine or bromine and $R^{11}$ is H or $C_1$–$C_6$ alkyl.

12. The process of claim 11, wherein $R^{11}$ is selected from the group consisting of H and $CH_3$.

13. The process of claim 1, wherein A is a vinyl group.

14. The process of claim 1, wherein A is a vinyl ether group.

15. The process of claim 1, wherein A is a vinylcarbazoyl.

16. The process of claim 1, wherein A is a styrene.

17. The process of claim 1, wherein A is a methacrylate or an acrylate group and B is a silylketene acetal group.

18. The process of claim 1, wherein A is a polymerizable group and B is activated to a group B* that causes the polymerization of A to occur, wherein growing polymer species contain only one A group and an increasing number of B* groups as the molecular weight of the polymer increases.

19. The process of claim 1, wherein activation of group B is accomplished by the addition of at least one activator molecule to the AB monomer.

20. The process of claim 19, wherein the activator molecule is selected from the group consisting of an alkyl aluminum halide or a Lewis acid.

21. The process of claim 20, wherein the alkyl aluminum halide is selected from the group consisting of $EtAlCl_2$ and $Et_{1.5}AlCl_{1.5}$.

22. The process of claim 20, wherein the Lewis acid is selected from the group consisting of $SnCl_4$, $SnCl_4$ combined with $Bu_4NCl$, $I_2$, HI combined with $I_2$, $SnCl_4$ combined with 2,6-di-tertbutylpyridine, and $CH_3SO_3H$ combined with $Bu_4NCl$ and $SnCl_4$.

23. The process of claim 1, wherein activation of group B is accomplished by applying heat to the AB monomer.

24. The process of claim 1, wherein activation of group B is accomplished by addition of a base.

25. The process of claim 24, wherein the base is selected from a hydroxide, an amine or carbanion.

26. The process of claim 24, wherein the base is butyl lithium.

27. The process of claim 1, wherein the activation of group B is accomplished by the addition of bifluoride or bibenzoate anion.

28. The process of claim 1, wherein activation of group B is accomplished by applying light to the AB monomer.

29. The process of claim 1, wherein the polymer is terminated by the addition of a quenching reagent.

30. The process of claim 1, wherein the polymer is quenched with a reagent to add functionalized chain ends to the polymer.

31. The process of claim 1, wherein the AB monomer is selected from the group consisting of 1-(2-vinyloxyethyloxy)-1'-[2-(1-acetoxyethoxy)-ethyloxy]-4,4'-isopropylidenediphenol; 1-vinyloxymethyl-4-(1-acetoxy)ethyloxymethylcyclohexane; 1-(2-vinyloxyethyl)-4-[(1-acetoxyethyloxy)ethyl]terephthalate; 2-(2-vinyloxyethyl)-2-[(1-acetoxyethyloxy)ethyl]diethyl malonate; 1-(2-vinyloxyethyl)-3-[(1-acetoxyethyloxy)ethyl]-5-(2-methacryloyloxyethyl)-1,3,5-benzene tricarboxylate; 1-[(4-ethenyl)-phenoxymethyl]-4-[4-(1-chloroethyl)phenoxymethyl]benzene; 4-(2-(1-chloroethyloxy))ethyloxystyrene; 4-(1-bromoethyl)styrene; 4-(1-chloroethyl)styrene, chloromethylstyrene, 3-(1-bromoethyl)styrene, and 3-(1-chloroethyl)styrene.

32. The process of claim 1, wherein an A—A monomer is added prior to the completion of polymerization.

33. The process of claim 32, wherein the A—A monomer is selected from the group consisting of divinyl ether, 1,1'-bis-(2-vinyloxyethoxy)-4,4'-isopropylidene diphenol, diethyleneglycol divinylether, butanediol divinyl ether, cylohexanedimethanol divinylether, hexanediol divinyl ether, cyclohexanediol divinyl ether, poly(tetrahydrofuran) divinyl ether, polyethyleneglycol divinyl ether, ethylene glycol divinyl ether, triethyleneglycol divinyl ether, tetraethyleneglycol divinyl ether, divinylbenzene, bis-(4-ethenylphenyl)methane, bis-1,2(4-ethenylphenyl)ethane, ethyleneglycoldimethacrylate, bis-1,2-(4-ethenylphenoxy)ethane, or bis-1,4-(4-ethenylphenoxy)butane.

34. The process of claim 32, wherein the A—A monomer is added in an amount such that precipitation of the polymer does not occur.

35. The process of claim 32, wherein after the A—A monomer is added the polymerization is quenched prior to the occurrence of crosslinking.

36. The process of claim 32, wherein the monomer is selected from the group consisting of a di-vinyl ether and a bis-ethenylbenzene.

* * * * *